United States Patent Office 3,070,568
Patented Dec. 25, 1962

3,070,568
COMPOSITIONS COMPRISING POLYETHYLENE, STEAM-CRACKED PETROLEUM RESIN, AND AGGREGATE AND PROCESS FOR BLENDING SAME
Albert M. Gessler, Cranford, and William J. Sparks, Westfield, N.J., assignors to Esso Research and Engineering Company, a corporation of Delaware
No Drawing. Filed Aug. 3, 1959, Ser. No. 831,044
17 Claims. (Cl. 260—41)

This invention relates to novel compositions comprising aggregates and/or fillers bonded with special polymer-resin blends, and to methods of preparing such compositions.

The invention comprises a thermoplastic composition of aggregates bonded with a binder comprising a blend of polyethylene and a steam-cracked petroleum resin, i.e. a polymerized olefin resin (from steam-cracked olefins), said composition having suitable thermoplastic processability and, when formed and cooled, having desirably high strength and flexibility characteristics over a wide temperature range from very hot to very cold. Such a composition may comprise, for instance, a fine sand having a coating of about 2 to 8% by wt. of a blend of a polyethylene of 1,000 to 10,000 mol. wt. and a steam-cracked petroleum resin.

The resin to be used for carrying out the invention may be any thermoplastic relatively linear type steam-cracked petroleum resin having a softening point between about 125° F. and about 230° F., preferably between 150° F. and 215° F., of low or no aromatic content and substantially free of cross-linking. These resins also should have a melt viscosity (cps.) of about 100–30,000, preferably about 150–20,000, at practical hot mixing and forming temperatures of about 200–500° F., preferably 250°–400° F. These resins also desirably should have a cold/hot viscosity ratio (300° F./500° F.) below 40, preferably about 1–20. The average molecular weight of these resins is about 1,000 to 1,500; and their sp. gr. is about 0.96–0.98, and generally about 0.97.

These resins are essentially methylated or other alkylated paraffin chains containing only a small amount of unsaturation, either of trans type II or terminal double bond. Tertiary hydrogen atoms produce misleading results when the material is analyzed for unsaturation by the Wijs iodine method unless a correction is made for substitution. An iodine value of 120 by the usual (Wijs method) when corrected for the presence of hydrogen halide from substitution gives a corrected iodine value of 23.

Typical properties of a steam-cracked petroleum resin having a softening point of 212° F. (100° C.) are given herebelow in Table I.

TABLE I

Physical:
  Form—Thermoplastic solid.
  Softening point (ball-and-ring) _____ ° C__ 100
  Specific gravity at 25/25° C. _____ 0.97
  Color, Gardner scale _____ 15
  Flash point (C.O.C.) _____ ° C__ 260
  Fire point _____ ° C__ 270
  Soluble in aliphatics and aromatics.

Chemical:
  Acid number _____ 1
  Saponification number _____ 2
  Ash, weight percent _____ 0.2
  Bromine number _____ 8
  Molecular weight, average _____ 1,100
  Double bonds per molecule, avg. _____ 2

The steam-cracked petroleum resins used in this invention are made by mild-Friedel-Crafts polymerization of a highly unsaturated liquid boiling in the vicinity of the naphtha boiling range, and containing mostly $C_6$ to $C_9$ hydrocarbons resulting from the steam-cracking of petroleum fractions such as naphtha, kerosene, gas oil, etc. with about 50 to 100 mole percent of steam at temperatures of about 1,000 to 1,500° F. Generally, in commercial operations, butadiene is removed, and usually also the isoprene. The resulting liquid which is available for use as polymerization feed to make the resin may have a boiling range of about 20 to 280° C. depending upon the boiling range of the cracking feed and conditions used for the steam cracking operation. Thus the polymerization feed may have a boiling range of from 20 to 170° C., or from about 30 to 280° C. The distribution of the constituents within these fractions may, of course, vary somewhat, but may be illustrated as follows for a feed having an over-all range of 20 to 170° C.

| Boiling point range of fraction: | Percent by weight |
|---|---|
| 20–70 | 0–60 |
| 70–130 | 65–40 |
| 130–170 | 35–0 |

In general, the over-all chemical composition of this polymerization feed is as follows.

| Composition: | Percent |
|---|---|
| Diolefins | 8–25 |
| Aromatics | 19–49 |
| Olefins | 68–30 |
| Paraffins and naphthenes | 5–1 |

As steam cracked petroleum fractions may contain a small amount of cyclodienes such as cyclopentadiene, methylcyclopentadiene, etc., and since it is preferred to exclude such cyclodienes from the polymerization feed for the purposes of the present invention, the steam-cracked naphtha is subjected to heating to about 90–140° C. to dimerize the cyclodienes, and then carefully distilling to take the $C_5$ to $C_9$ constituents overhead but to leave as residue the dimerized cyclodienes. The resulting cyclodiene-free steam-cracked petroleum naphtha (for instance, a fraction boiling from about 20 to 140° C.) would have a chemical composition about as follows.

| Composition: | Percent |
|---|---|
| Benzene | 15–30 |
| Toluene | 3–10 |
| $C_8$ aromatics | Below 1 |
| Diolefins | 11–25 |
| Olefins | 70–29 |
| Paraffins | 0–5 |

It should be noted that since the polymerization process used for making the resin is relatively mild, the benzene and toluene or other aromatics that do not actually enter into the reaction, are subsequently removed when the resin is stripped of volatile solvent, or low boiling polymerization fractions.

The polymerization is generally carried out at about −40° C. to +70° C. with about 0.25–3.0% of a Friedel-Crafts catalyst such as $AlCl_3$, $BF_3$, $TiCl_4$, etc., as, for instance, a temperature of 25° C. with 1% of powdered $AlCl_3$ (of about 30 mesh) as catalyst. When the polymerization is finished, the reactor contents may be washed with 5% aqueous NaOH, and several times with water, and then heated under vacuum, e.g. 5 to 50 mm. pressure absolute, to strip off volatile constituents and leave a light-colored resin. By stripping to higher temperatures and/or under higher vacuum conditions, the softening point of the resin may be raised from the vicinity of 150° F. to 212 or 215° F. These resins may be made by the processes outlined further in detail in U.S. Patents 2,734,046, 2,770,613, and others.

If especially light-colored, or substantially colorless resins are desired, or resins of low or substantially zero unsaturation, the resins prepared as above may be further treated by hydrogenation, as described in Patent 2,824,860.

If desired, two or more different individual types of steam-cracked petroleum resins may be mixed together in any desired proportions, for blending with the polyethylene, in order to obtain a final blend having the desired combination of softening point, color, viscosity, cold/hot viscosity ratio (300° F./500° F.), etc., and in turn, when the hot blend is mixed with aggregates, to give the desired Marshall stability (at 140° F.) of at least 2,000 lbs., a flow of about 4–25, and a cold/hot stability ratio (15° F./140° F.) below 12, preferably about 1–10.

In order to illustrate a variety of different individual steam-cracked petroleum resins which may be made, the various hydrocarbon streams containing olefins, diolefins, aromatics, and saturated hydrocarbons obtained by steam cracking of gas oils were polymerized in the presence of a Friedel-Craft type catalyst at various temperatures. The resins were recovered by stripping off the unreacted hydrocarbons by vacuum distillation. Analysis in each case indicated that the resin was of a non-aromatic structure, since little or none of the aromatic constituents of the feed entered the composition. The data are summarized in the following table:

aggregates, in order that the binder-aggregate composition should have a Marshall stability (at 140° F.) of at least 2,000, preferably about 3,000 to 30,000 and a Marshall flow of about 4–25, preferably about 7 to 20, a 140° F. stability/flow ratio of about 250–3,000, preferably 300–2,000, and finally, this binder-aggregate composition should have a cold/hot Marshall stability ratio (75° F./140° F.) below 12, preferably in the range of 1 to 10, 1 to 5 being particularly desirable.

Thus in general, minor proportions, e.g. 1 to 50% preferably about 5 to 40%, of the polyethylenes may be blended with a major proportion of steam-cracked petroleum resin in order to obtain the best combination of easy hot processability, and strength and flexibility of resulting compositions, yet with lowest cost. Thus, even a few percent, e.g. 1 to 10 or 20% of relatively high mol. wt. polyethylene, e.g. a commercial product called DYNH having mol. wt. of about 20,000, or a product called Marlex 50 having an even higher mol. wt. of about 200,000, and having a highly crystalline structure, will raise the Marshall stability of an aggregate composition containing a steam-cracked petroleum resin having a softening point of about 150° F. from 3,000 up to the range of 5,000, 8,000 or even 12,000. On the other hand, larger amounts, e.g. 20 to 50% of the lower mol. wt. polyethylenes, e.g. 1,500 to 10,000 mol. wt., when blended with a similar steam-cracked petroleum resin will not make an impressive increase in Marshall stability value but will

TABLE II

| Resin No. | 1 | 2 | 3 | 4 | 5 | 6 | 7 | 8 | 9 |
|---|---|---|---|---|---|---|---|---|---|
| Approx. boiling pt. (° C.) | 20–48 | 20–125 | 20–125 | 38–130 | 48–130 | 48–130 | 30–280 | 85–260 | 85–260 |
| Composition, weight percent (approx.): | | | | | | | | | |
| Diolefins a | 30 | 20 | 20 | 19.4 | 12 | 12 | 15 | 15 | 15 |
| Olefins a | 60 | 48 | 48 | 50.6 | 50.9 | 50.9 | 62 | 45 | 45 |
| Aromatics: | | | | | | | | | |
| Benzene | | 25 | 25 | 22 | 28.5 | 28.5 | 4.5 | | |
| Toluene | | 6 | 6 | 7 | 7.6 | 7.6 | 10.1 | 10 | 10 |
| Higher | | | | | | | 7.2 | 15 | 15 |
| Paraffins, naphthenes | 10 | 1 | 1 | 1 | 1 | 1 | 1.2 | 15 | 15 |
| Polymerization: | | | | | | | | | |
| Catalyst b | $AlCl_3$ | $AlCl_3$ | $AlCl_3$ | $AlCl_3$ | $AlCl_3$ | $BF_3$ | $AlCl_3$ | $AlCl_3$ | $BF_3$ |
| Temperature (° C.) | 15 | 25 | 100 | 45 | 45 | 25 | 25 | 20 | 50 |
| Resin, weight percent 1 | 65–85 | 25–35 | 19 | 30–36 | 18–23 | 15 | 20–30 | 16 | 11 |
| Soft. pt.1 (° C.) | 70–85 | 70–90 | 66 | 85–95 | 80–95 | 74 | 85–100 | 96 | 76 |

1 The exact softening point and yield depend upon the degree of work-up of the resin, such as stripping conditions, etc.
a Diolefins and olefins are the only reactants.   b About 1% on weight of feed.

Suitable polyethylenes include solid polyethylenes of relatively low mol. wt., e.g. about 1,000 to 10,000 or intermediate mol. wt., e.g. 20,000 to 30,000 or so, of low-density type, or of the more recently developed high-crystalline high-density types, having higher mol. wt. ranges, e.g. about 40,000 to 200,000 or more, made either by an aluminumtriethyl-$TiCl_4$ type catalyst or by a chromium oxide on reduced silica type catalyst. Copolymers of ethylene with minor amounts of comonomers, e.g. ethylene-propylene, ethylene-butylene, styrene-ethylene, etc. may be used.

The proportions in which the polyethylene and the steam-cracked petroleum resin are to be mixed may vary over a wide range, depending upon the properties of each individual constituent. Normally it is desired that proportions be used as required in order to make a finished blend having a softening point of about 110–230° F., preferably about 120–215° F., a viscosity (cps.) of about 100–30,000, preferably about 150–20,000, at practical hot mixing and forming temperatures of about 200–500° F., preferably about 250–400° F., and it is also desirable that the resin-polyethylene blend have a cold/hot viscosity ratio (300° F./500° F.) below 40, preferably in the range of 3–20. The reason for this requirement is that it is desirable that when these blends are mixed with sand or other aggregates, the resulting compositions will not change too much in strength characteristics over wide ranges in climatic temperature. Thus, the proportions of the resin and polyethylene may also be partially controlled by the properties of the mixture thereof with sand or other improve the stability/flow ratios over various temperature ranges, and will provide less flexibility in strength and flexibility characteristics over climatic temperature changes.

Furthermore, most important from certain points of view, the larger the amount of polyethylene used in the blends, and the more crystalline and the higher its molecular weight, the greater the oil-resistance of the blends per se and aggregate compositions containing them will be. Thus, the paving around gasoline service stations, airport runways, particularly the jet planes, and for any articles of manufacture which should be resistant to softening with oils such as gasoline, kerosene, lubricating oils, etc., large amounts of polyethylene, and particularly of higher mol. wts. and high density, should be used, e.g. at least 30% or so of the lowest mol. wt. polyethylene (e.g. 1,500 mol. wt.) or at least 10 or 20% of higher mol. wt. polyethylenes of 10,000 mol. wt. and higher.

At the other end of the scale of proportions, it may be desirable to add relatively small amounts of steam-cracked petroleum resin to a major proportion of polyethylene, particularly to a polyethylene having a mol wt. of 10,000 or higher, especially the 20,000 to 50,000 mol. wt., in order to improve the thermoplastic, processability, and heat-sealing characteristics of the polyethylene and yet still retain the high quality oil-resistance and chemical resistance of the polyethylene. Thus, the use of as little as 5 to 10 or 20% of the steam-cracked petroleum resin having a softening point in the range of 150–212° F. will make a tremendous improvement in the processing and other characteristics of a conventional low density polyethylene of 20,000 mol. wt., and even a relatively greater improvement in the more crystalline high density polyethylenes of 50,000 mol. wt. with high mol. wt. polyethylene, e.g. 60,000–500,000 mol. wt., large amounts of resin, e.g. 20–60% or so, are usually required to give desired viscosity for processing.

The aggregates to be used according to the invention may be of numerous conventional types or certain specially adapted types, as will be discussed further hereinbelow. For thin sections or surface layers, e.g. about 1/16" to 1/2" or so, a fine aggregate should be used, such as a sand having a grading of about 1/4" down to 100 mesh, or a finer sand ranging from 8 mesh to 100 mesh may be used; or even finer fractions may be used, such as 20 mesh to 100 mesh, and with any of these, some dust-type filler may be used, such as ground limestone, pulverized sand, silicas, clays, etc. For coarser sections, slabs or bulk articles, e.g. from 1/2" to 1 ft., or 5 ft. or more in thickness, with or without an over-lying finer surface coating, large crushed aggregates may be used, such as crushed stone, gravel and air-cooled slag, having either a mixed grading of 1/2" to 3", or 1/4" to 2" or 1/2" to 1", etc. Alternatively, if a fairly thick section, e.g. 2" to 1 ft. or more is to be used without any finer surface coating, the aggregate used may be composed of both coarse and fine aggregate and may include a dust filler, such as a mixture of 100 parts by wt. of coarse stone, 80 parts by wt. of sand, and 4 to 5 parts by wt. of powdered limestone. The above aggregates may be graded either for density and lowest voids, or for a controlled desired amount of voids, e.g. 3%, 5%, 8%, etc. voids.

If desired, the fine fillers to be used, e.g. crushed silicas, clays, ground limestone, or even carbon black, etc. may be subjected to severe attrition, e.g. by ball-milling with steel balls, or roll-milling one or several times through tight set steel rolls, or stamping or any other severe attrition, prior to mixing with the polymer to be coated. It has been found that such severe attrition activates the surface of the filler particles at the places where the particles have been broken or otherwise attrited, and thereby provides a tighter bond when the blend of polyethylene and steam-cracked petroleum is subsequently coated thereon, and the mixture is shaped, compacted and cooled.

Various methods may be used in carrying out the present invention, depending upon various factors such as the particular type of resin-polyethylene composition used, the type of aggregate used and according to the type of mixing equipment available. One technique, referred to as hot plastic mixing, is to heat the resin-polyethylene blend to be used, to a temperature about 100–300° F. above its softening point, until it has softened to a hot fluid consistency, and then stir the aggregate, preferably dried and preheated, into it, preferably gradualy, until the final composition comprises about 90 to 99% by wt. of aggregate and about 1 to 10%, preferably about 2 to 8% by wt. of resin-polyethylene blend. The preferred method is to add binder to preheated aggregated, in the way asphalt is mixed in a pug mill.

Thus, for example, two parts by weight of a steam-cracked petroleum resin having an average mol. wt. of about 1,100, which has a softening point of about 212° F. (by ring-and-ball method, ASTM Standards, D36–26) may be added to one part of 5,000 mol. wt. polyethylene on a mill at a temperature of about 300° F., and then a sand having a grading of about 1/4" down to 100 mesh, preheated to a similar temperature, is gradually mixed with the hot resin-polyethylene blend until the mixture contains about 95% by wt. of sand and 5% of resin-polyethylene blend and is substantially homogenous. These may be mixed in kettles with lower mol. wt. polyethylenes, say up to about 10,000–15,000 mol. wt. This hot mixture is then ready for use in forming blocks, slabs, or other articles, or for application to a road surface where it is then compacted by rolling or tamping or any other suitable method. Alternative polyethylene-resin blends may be used, such as a 20,000 mol. wt. polyethylene, which may be mixed on a mill, with a steam-cracked petroleum resin having a softening point of 158° F. or 185° F. or with a mixture of about 40 to 80% by wt. of 212° F. softening point resin mixed with about 20 to 60% by wt. of similar steam-cracked petroleum resin having a softening point of 158° F., each being polymerization products of a feed in which the reactants comprise essentially about 25%, about 25% aliphatic dienes, and about 75% aliphatic alkenes. Another blend which can be used comprises about 10 to 50% of polyethylene having an average mol. wt. of about 5,000 to 20,000, mixed with about 50 to 90% by wt. of steam-cracked petroleum resin having an average mol. wt. of about 1,000 and having a softening point of about 158° F.

A remarkable fact is that, although many plastic materials, oils and other softeners can be mechanically mixed with polyethylene, only steam-cracked petroleum resins are truly soluble in polyethylene.

One advantage of adding the polyethylene, e.g. 10–50%, especially a crystalline polyethylene, to the steam-cracked petroleum resin as the binder for the aggregates, is that the resulting composition, when shaped, compacted and cooled, is substantially oil-resistant. This means, for instance, that it is resistant to softening by jet fuel spillage on airport runways, airplane carrier runway decks, etc., and also resistant to softening by gasoline, kerosene or lubricating oil, which may accidentally come in contact with paved surfaces around gasoline filling stations, repair garages, etc. For instance, slabs of such resin-polyethylene-bonded sand, about 4' x 8' in area, and 1/2" or 1" thick can be precast or molded, in a factory, and then cemented in place as a complete floor covering in a commercial garage or at a service station, preferably using an ordinary asphalt cement or various available plastic cements as a grouting to insure a good bond between the slabs and the underlying floor surface.

Similar resin-polyethylene-sand compositions may be hot-molded in the shape of ordinary bricks or "concrete" blocks, and used for building walls, floors, partitions, etc. or for special paving purposes, such as a surface coating on bridges, which are subject to excessive vibration, wide temperature fluctuations, etc., where concrete, asphalt paving and wooden blocks are not as satisfactory as desirable.

For paving highways, airport runways, airplane carrier decks, parking lots, bus stations, etc., such oil-resistant polyethylene-resin-sand compositions may be hot-rolled directly in place, either as a thin surface layer, e.g. 1/4", 1/2" or an inch or so thick, or, together with coarse aggregate, as a 2" to 8" or thicker load-supporting base layer, and then covered with a thin seal coat on the surface. Depending on the color of the fine aggregate used, or the dust filler used (if any), the polyethylene-resin-bonded sand surface layer will be found to be much lighter than conventionally used asphalt surfacing, and therefore will give much better visibility for night driving, particularly when the roads are wet.

A great advantage of the present compositions is that the polyethylenes are substantially colorless, and the thermoplastic resins used are all pale yellow to essentially colorless, i.e. a Gardner color at least as light as or lighter than 15, preferably 15 to colorless, and therefore when the polyethylene and resin are hot-mixed with sand, with or without filler, they can easily be given any desired color by adding a relatively small amount of a pigment. For instance, for a white, or light gray, a few (e.g. 0.5–5.0) percent of white titanium dioxide pigment may be used. For other purposes, red, yellow, orange, green, blue, or even black pigments may be used, as for identifying traffic guides or certain areas of paving, etc., or for ornamental purposes, in manufactured articles, etc.

Another novel method of using the compositions of this invention, e.g. a mixture of a fine sand of about 20 mesh to 100 mesh or 200 mesh, coated with about 4 to 6% or 8% of a blend of 30 parts of polyethylene of 5,000 mol. wt. with 70 parts of a steam-cracked petroleum resin of about 212° F. softening point, may be hot mixed and then sheeted out into thin sheets or films ranging from ⅛" thick to 1/16", 1/32" (or even thinner if a fine sand is used), by passing the hot mixture through one or more pairs of rolls cold enough to make the sheet maintain its shape, and additionally cooling, if necessary, with cold air, water spray, or water bath, drying, and finally rolling up the resulting flexible strip into large rolls. These rolls, which may be any desired width, such as only 2" to 1' in width for marking traffic lines on highways, etc. up to 4', 6', 8', or more in width for laying down a light-colored oil-resistant and jet blast resistant surface coating on airport runways, airplane carrier decks, etc., or a surface coating to merely lighten up the color of an asphalt highway or to smoothen over a concrete highway. Such a strip roll material may also be used in place of conventional tar paper for covering sloping roofs, or, where they are especially advantageous, for flat roofs, because such polyethylene-resin-bonded sand is not subject to serious deterioration by oxidation and cracking as is the case with asphalt. For roofing purposes, one or two percent of carbon black may be added to the composition in order to stabilize against the depolymerizing effect of ultraviolet light and sunlight, or colorless ultraviolet light absorbers may be added.

The composition of this invention may also be used for paving the beach runways, beach groins, jetties and levees, either by hot rolling method, or coating with preformed thin slabs or strip rolls.

Numerous molded or extruded articles may be formed from these polyethylene-resin-bonded aggregate compositions. Conduit pipe may be extruded in various dimensions, e.g. from small sizes such as ½" inside diameter to larger and thicker conduits of 5" or 6" inside diameter. With a light-weight vermiculite filler, instead of or in addition to fine sand or other filler, these compositions make excellent sound-deadening thermal insulation. Acid-resistant battery boxes may readily be molded from these compositions. Likewise, smaller, thinner articles such as phonograph records, as well as numerous pans, buckets, bowls, or other containers, various tools, or tool-handles, doorknobs, telephone receivers, instrument housings, electrical insulators, etc. may be readily made by selection of appropriate polyethylene and thermoplastic steam-cracked petroleum resin and proportions thereof, as well as the type and screen size of filler, within the purvue of the present invention.

Larger or more bulky articles may also be formed, either by molding or tamping, e.g. railroad ties, large diameter pipes, e.g. 1' or 5' or more in diameter, with or without steel wire or mesh reinforcing, for conducting water, or for use in sewage systems, or gas mains, or for transporting crude oil or refined petroleum liquids. Other hydraulic structures include water tanks, reservoirs, dam spillways, etc., or storage tank bottoms, etc. Pre-cast structural columns, e.g. telephone poles, piles, etc. may be made. Such piles have the advantage that sections thereof are joinable by a thermoplastic welding, i.e. by heat-softening the ends of two units which are then combined under suitable pressure and permitted to cool until solidified.

Relatively thin coatings of a steam-cracked petroleum resin-polyethylene-bonded sand may advantageously be applied by a hot rolling or hot pressing technique onto the surface of concrete blocks or cinder blocks, either just on the exterior side to be exposed to the rain and weather or in contact with wet earth as in a house foundation, or may be applied to both the interior and exterior surfaces, or if desired, all of the surfaces of such blocks or construction slabs made of concrete, clay bricks, tiles, or even wood, may be coated with a relatively thin layer of these thermoplastic compositions.

For coating either small or large diameter pipes or for protecting electric cables to be placed underground or underwater, one or more layers of polyethylene-resin-bonded filler having a polyethylene-resin blend content of about 5 to 10%, and having a thickness ranging from a few mils to ¼ or ½" or so (or even thicker) if handled in a more highly heated condition, can be applied by the spiral strip coating method. The present compositions are low enough in cost to economically permit the use of coatings ⅛" or ¼" or so in thickness around large steel pipe, to prevent corrosion thereof, whereas the relatively thin films of plain polyethylene now sometimes used for such spiral coating of steel pipe, are so thin that they are readily subject to mechanical damage by contacting with rough, rocky surfaces or by contact with mechanical equipment or tools. On the other hand, it would be far too expensive to use sheets of plain polyethylene ⅛" or more thick.

In the present compositions, the cost is tremendously reduced by the use of 90–95% of sand (or other filler), and is further reduced by diluting the expensive polyethylene with a much lower cost steam-cracked petroleum resin.

The compositions of the present invention, at least when used in substantial thicknesses, are relatively fireproof or fire-resistant, except when exposed to high temperatures over a long time. However, if desired to increase the fire resistance of articles made of the present compositions, various fireproofing materials may be incorporated, such as highly chlorinated naphthalenes, organic fluorides, phosphates, siloxanes, silicates, etc.

An additional method of using the compositions of this invention, not practical with materials available heretofore, is to make large sheets or slabs, containers, piping, etc. by a technique analogous to that used in making corrugated paper board, but using thermoplastic heat-sealing for bonding a flat sheet of polyethylene-resin-bonded aggregate. Such corrugated sheets may be readily made while the sheet is still in a hot forming condition. For effecting the desired heat-sealing, the outer edges of the corrugated sheet may be passed near or through a hot flame or other heating element, and the side of the flat sheet to be bonded therewith may also be heated at least sufficiently to make it tacky so that it will bond readily to the corrugated surface when contacted therewith under slight pressure. Laminated slabs of great strength can be made by bonding together two or more of the resulting corrugated slabs, with the corrugation "grain" at right angles to each other.

The details and the advantages of the invention will be better understood from a consideration of the following specific examples:

EXAMPLES 1 TO 4

One part by wt. of a 1,500 mol. wt. polyethylene was mixed with two parts of a steam-cracked petroleum resin having a softening point (ring-and-ball method) of about 158° F., an average mol. wt. of about 1,000, a specific gravity (25/25° C.) of about 0.96 and polymerized with about 1% AlCl₃ at about room temperature, from a feed having a boiling range of about 20–140° C., and containing about 14–20% diolefins, about 45–52% olefins, and about 28–41% of inert aromatics and saturated hydrocarbons, and the resulting polyethylene-resin blend was heated to about 300° F. and mixed in a concentration of 6.5% by wt. with coarse and fine aggregate, using the following formulation.

| Material: | Parts by wt. |
|---|---|
| ½" stone | 180 |
| ⅜" stone | 450 |
| Sand | 492 |
| Binder (resin) | 78 | the aggregate has also been preheated to a temperature of about 300–400° F. After thorough mixing to a hot thermoplastic moldable mixture, it was tamped into the hollow cylindrical mold, about 3" high and 4" in diameter, used for making Marshall stability tests. This test is described in the pamphlet, "The Marshall Method for the Design and Control of Bituminous Paving Mixtures," published by the Marshall Consulting and Testing Laboratory. In making the tests, the polyethylene-resin-bonded aggregate cylinder (after cooling) is removed from the mold and subjected to a load applied diametrically about the circumference at a constant rate of 2" per minute until failure (or until maximum load). The load, in lbs. at failure, or the maximum load, is called the Marshall stability, and indicates the strength of the composition against shearing forces. The amount of deformation at failure (or at maximum load) is given in 1/100 of an inch, and is called the "flow." The Marshall stability test is usually made at 140° F., but may also be made at other temperatures for comparison.

The composition of Example 1 showed a Marshall stability (at 140° F.) of 2,350 lbs. and a flow of 7. The stability/flow ratio was calculated and found to be 335, because in general, for purposes of the present invention, it is desired to have a stability/flow ratio of about 250–3,000, or preferably 300–2,000, when tests are made at 140° F. These values are substantially superior to a value of only 14 for a corresponding asphalt-aggregate composition containing an asphalt having a penetration of 85–100 at 77° F.

Example 1 was repeated three times except for the substitution of polyethylenes of 5,000 mol. wt. in Example 2, 10,000 mol. wt. in Example 3, and 20,000 mol. wt. in Example 4.

The data for all four of these examples are summarized in the table herebelow.

TABLE III—EXAMPLES 1–4

*Concrete Made With Blends of 67% of Piccopale 70 With 33% of Polyethylenes of 1,500–20,000 Mol. Wt.*

| Example | 1 | 2 | 3 | 4 |
|---|---|---|---|---|
| Mol. weight of polyethylene | 1,500 | 5,000 | 10,000 | 20,000 |
| Marshall stability (at 140° F.) | 2,350 | 3,600 | 4,200 | 6,650 |
| Marshall flow | 7 | 11.5 | 13.0 | 13.0 |
| Stability/flow ratio | 336 | 313 | 323 | 511 |

The above table shows that the Marshall stability (at 140° F.) of the concrete made with blends of 67% of the Piccopale 70 steam-cracked petroleum resin with 33% of polyethylenes ranging from 1,500 to 20,000 mol. wt. increase three-fold in changing from the 1,500 mol. wt. to the 20,000 mol. wt. polyethylene. Quite surprisingly, the flow also increases from 7 up to 13 with increasing mol. wt. of the polyethylene. Thus, all four of these compositions show Marshall stability values substantially superior to those of corresponding asphalt made with an 85–100 penetration asphalt (a particular control sample showed only 350 for that asphalt).

These data also show that the resin-polyethylene blends produced concrete having a stability/flow ratio well above 300, whereas asphalt concrete compositions generally range from about 10 to 200, a control sample of 85–100 penetration asphalt giving a very low value of 14.

EXAMPLES 5 TO 8

Another series of tests were made with varying proportions (10 to 50%) of one particular steam-cracked petroleum resin (i.e. Piccopale 100, which has a softening point of about 212° F.), with one particular polyethylene, i.e. of 5,000 mol. wt. The same grading of aggregate was used as in Examples 1 to 4 and the same proportions of resin-polyethylene binder, i.e. 6.5% by wt. was used. The data obtained are shown in the following Table IV.

TABLE IV—EXAMPLES 5–8

*Concrete Made With Blends of 10–50% of Piccopale 100 With Polyethylene of 5,000 Mol. Wt.*

| Example | 5 | 6 | 7 | 8 |
|---|---|---|---|---|
| Composition of binder (percent): | | | | |
| Piccopale 100 | 10 | 20 | 30 | 50 |
| Polyethylene (5,000 m.w.) | 90 | 80 | 70 | 50 |
| Marshall stability (at 140° F.) | 3,150 | 3,950 | 3,300 | 2,500 |
| Marshall flow | 8.5 | 7.5 | 16.5 | 11.0 |
| Stability/flow ratio | 370 | 526 | 200 | 227 |

The above data show that with all of the different proportions of the Piccopale 100 and the polyethylene of 5,000 mol. wt., Marshall stability values (at 140° F.) were always well above 2,000, namely between 2,500 and about 4,000. The chief effect of increasing the proportion of the Piccopale 100 from 10 to 50% was to increase the flow from the range of 7 to 8 up to the range of 11 to 16. This means that hot thermoplastic compositions with the proportions of 30 to 50% of Piccopale 100 would be easier to handle both in the form of the binder per se, and also would be easier to mix with the hot aggregate in making concrete. The stability/flow ratios ranged from 200 up to 526.

EXAMPLES 9 TO 14

A series of six tests were made, which may be considered the reverse of the proportions used in Examples 5 to 8. In this new series the concentration of a polyethylene (20,000 mol. wt.) was increased from 14% to 40%, the remainder of the major proportion being a Piccopale 70 steam-cracked petroleum resin (having a softening point of about 158° F.). The data obtained are shown in the following Table V.

TABLE V—EXAMPLES 9–14

*Concrete Made With Blends of 14–40% of Polyethylene of 20,000 Mol. Wt. With 86–60% of Piccopale 70*

| Example | 9 | 10 | 11 | 12 | 13 | 14 |
|---|---|---|---|---|---|---|
| Composition of binder: | | | | | | |
| Percent polyethylene of 20,000 mol. weight | 14 | 20 | 25 | 28.5 | 33 | 40 |
| Percent Piccopale 70 | 86 | 80 | 75 | 71.5 | 67 | 60 |
| Marshall stability (at 140° F.) | 7,500 | 8,150 | 8,500 | 7,100 | 7,250 | 6,750 |
| Marshall flow | 14 | 12 | 10 | 12 | 10 | 10.5 |
| Stability/flow ratio | 535 | 680 | 850 | 591 | 725 | 641 |

The above Table V shows that with the blends of polyethylene of 20,000 mol. wt. and Piccopale 70, even with a wide variation in proportions from 14 up to 40% of the polyethylene, these blends all produced concrete having Marshall stability values (at 140° F.) ranging between 6,000 and 9,000 lbs., and the flow in all cases ranged between 10 and 14. This makes an excellent combination of concrete having high strength and resiliency and yet easy processing for hot thermoplastic flowing into place and tamping or molding into proper shape. Correspondingly, all of these six concrete mixtures had excellently high stability/flow ratios ranging between 500 and 900 (far above the corresponding range of about 10 to 200 for corresponding asphalt compositions).

EXAMPLES 15 TO 20

A different type of series of tests were made to compare the Marshall stability values of a single blend of polyethylene (20,000 mol. wt.) and a single steam-cracked petroleum resin (Piccopale 70), using in all tests the same proportions of 67% of the resin and 33% of polyethylene, but ranging the temperature of the Marshall stability tests from 7° F. up to 140° F., thus substantially spanning practically the widest normal variation of climatic road temperatures from cold winter to hot summer. For comparison, corresponding data on an asphalt concrete were also obtained, using an 85–100 penetration asphalt. The same grading of aggregate was used in both of these series as in Examples 1–4. The data obtained are shown in the following Table VI:

TABLE VI—EXAMPLES 15–20

*Stability Values at 7° F. to 140° F. for Concrete Made With Blends of 33% of Polyethylene (20,000 Mol. Weight) and 67% Piccopale 70 and Comparison With Asphalt Concrete*

| Example | Temp. °F. | Polyethylene-Piccopale 70 | | Asphalt | |
|---|---|---|---|---|---|
| | | Stability | Flow | Stability | Flow |
| 15 | 7 | 30,000 | 8 | 21,300 | 13 |
| 16 | 32 | 28,350 | 6 | 18,200 | 16 |
| 17 | 50 | 28,500 | 11 | 12,400 | 12 |
| 18 | 75 | 28,700 | 12 | 5,700 | 10 |
| 19 | 110 | 13,950 | 12.5 | 1,500 | 9 |
| 20 | 140 | 6,500 | 16.0 | 350 | [1] 25 |

| | Polyethylene-Piccopale 70 | Asphalt |
|---|---|---|
| 18 | 2,390 | 570 |
| 19 | 1,110 | 166 |
| 20 | 406 | 14 |

[1] Compares to 25 flow with stability at 350 lbs.

NOTE.—Cold/hot stability ratio )75° F./140° F.) = 4.4, 16.3.

The above table shows that the concrete made with polyethylene-Piccopale 70 blend had an excellently high Marshall stability value ranging from 28,000 to 30,000, and coupled with a reasonably good flow (from 6 to 12) over the whole range of low temperatures ranging from 7° F. up to 75° F., and then at 110 the Marshall stability flow only reduced to 14,000, still with a flow of 12, and then at 140° F. only reduced slightly further to 6,500 lbs. stability and a flow of 16. This indicates that even at the exceedingly low cold weather temperature of 7° F. this type of concrete would be exceedingly strong and resilient, and yet when heated to a hot summer road temperature of 140° F. would still have the excellently high stability value of 6,500 with only a moderately increased flow of 16.

On the other hand, the corresponding asphalt concrete, using the 85–100 penetration asphalt, which has a relatively low softening point of 115° F., had reasonably good Marshall stability values of 12,000 to 21,000 when the temperature was lowered from 70° F. down to 50° F., yet maintained good flow values of 12 to 16, yet this asphalt concrete showed serious loss of stability (from 12,000 down to 5,700) as the temperature was raised from 50° F. up to the normal 75° F., and then dropped even more seriously down to 1,500 lbs. at the temperature 110° F., and dropped most seriously down to the undesirably low value of 350 lbs. at 140° F., with a correspondingly excessive high flow value of 25. This means that such asphalt concrete completely loses strength and load-supporting ability at the warmer summer load temperatures.

Thus the polyethylene-steam-cracked petroleum resin blends used for bonding aggregates according to the present invention enable making paving construction having far superior stability over cold to hot temperature ranges, and thus also permit the manufacture of numerous articles of commerce such as bricks, building blocks, pre-cast slabs for floors, walls, roofing, etc., extruded pipe and numerous other articles which must retain their strength and resiliency over wide climatic temperature ranges, whereas corresponding asphalt-concrete compositions have not been practical for making such articles of commerce.

EXAMPLES 21 TO 25

Another series of tests were made using blends of 14 to 33% of a very high mol. wt. high density polyethylene, i.e. 200,000 mol. wt., with 86–67% of Piccopale 70 steam-cracked petroleum resin, using the same aggregate grading having proportions as in the earlier tests. The data obtained are shown in the following Table VII:

TABLE VII—EXAMPLES 21–25

*Concrete Made With Blends of 14–33% of Polyethylene of 200,000 Mol. Wt. and 86–67% of Piccopale 70*

| Example | 21 | 22 | 23 | 24 | 25 |
|---|---|---|---|---|---|
| Composition of Binder: | | | | | |
| Percent Polyethylene (200,000 mol. weight) | 0 | 14 | 20 | 25 | 28.5 | 33 |
| Percent Piccopale 70 | 100 | 86 | 80 | 75 | 71.5 | 67 |
| Marshall stability (at 140° F.) | 3,000 | 10,250 | 11,200 | 12,850 | 14,900 | 14,100 |
| Marshall flow | 13 | 15 | 13.5 | 15 | 16 | 15 |
| Stability/flow ratio | 230 | 683 | 830 | 856 | 930 | 940 |

The above data show that whereas the use of the steam-cracked petroleum resin called Piccopale 70 gives a concrete having a Marshall stability value of 3,000 (already greatly superior to asphalt concrete with values of from 200 or so up to 2,000), the blends of the Piccopale 70 containing from 14 to 33% of the 200,000 mol. wt. polyethylene showed tremendously high Marshall stability values ranging from 10,000 up to almost 15,000. Yet all of these blends give excellent Marshall flow values in the range of 13 to 16, thus showing easy processability and excellent thermoplastic properties for hot molding, extrusion and other types of hot forming. Thus, these binder compositions would make excellent tough, resilient concrete for paving purposes, as well as for making structural articles such as slabs, beams, columns, concrete blocks, and numerous other articles which have not heretofore been producible by an easy, low-cost process with low-cost materials.

EXAMPLES 26 TO 30

A further series of tests was made using as binder for the concrete five blends, ranging from 14 to 50% by wt. of polyethylene of 10,000 mol. wt., together with a Piccopale 70 steam-cracked petroleum resin. The data obtained are shown in the following Table VIII.

TABLE VIII—EXAMPLES 26–30

*Concrete Made With Blends of 14–50% of Polyethylene of 10,000 Mol Wt. With Piccopale 70*

| Example | 26 | 27 | 28 | 29 | 30 |
|---|---|---|---|---|---|
| Composition of binder: | | | | | |
| Percent polyethylene (10,000 m.w.) | 14 | 20 | 25 | 33 | 50 |
| Percent Piccopale 70 | 86 | 80 | 75 | 67 | 50 |
| Marshall stability (at 140° F.) | 2,200 | 2,650 | 3,200 | 3,450 | 4,250 |
| Marshall flow | 12 | 11 | 10 | 10 | 7 |
| Stability/flow ratio | 182 | 240 | 320 | 345 | 605 |

The above data show that these blends all give satisfactory Marshall stability values ranging from 2,000 to over 4,000 (much higher than corresponding asphalt concrete values ranging from about 200 to about 2,000), and yet they all have good Marshall flow values ranging from 7 to 12. Increasing the concentration of polyethylene (from 14 to 50%) raised the Marshall stability gradually and conversely lowered the flow. Except for the Example No. 26, having the lowest stability of 2,200, the stability/flow ratio values were all well above 200, ranging up to 605 for Example 30 in which equal parts of the polyethylene and Piccopale 70 resin were used. Thus, with the particular combination of these specific binder constituents, it appears that the best combination of stability and flow are obtained with concentrations of about 25 to 33% or so of the 10,000 mol. wt. polyethylene with the balance of 75–67% of the Piccopale 70 resin.

As indicated hereinabove for the widely differing proportions and commercial applications of this invention, the proportions of resin and polyethylene may be varied substantially, and also the mol. wt. of the polyethylene and the softening point of the steam-cracked petroleum resin.

It is not intended that this invention be limited to the specific examples which have been given merely for the sake of illustration, but only by the appended claims in which it is intended to claim all novelty inherent in the invention and all modifications coming within the scope and spirit of the invention.

What is claimed is:

1. A composition comprising aggregate having the major proportion of its particles of about 100 mesh and larger bonded with about 1 to 10% by wt. of a thermoplastic blend of polyethylene and steam-cracked petroleum resin having a softening point measured by the ring and ball method of between about 125° F. and about 230° F., an average mol. wt. of about 1,000 to 1,500, a specific gravity measured at 25/25° C. of about 0.96 to about 0.98, and a carbon/hydrogen ratio of about 6.0–7.0.

2. Composition according to claim 1 derived from a steam-cracked petroleum naphtha fraction having a boiling range between about 20° C. and 280° C. having approximately the following composition:

| Constituents: | Percent |
|---|---|
| Aromatics | 19–49 |
| Diolefins | 8–25 |
| Olefins | 68–30 |
| Paraffins and naphthas | 5–1 | of which only the diolefins and olefins are reactants.

3. Composition according to claim 1 having a Marshall stability measured at 140° F. of at least 2,000 lbs.

4. Composition according to claim 3 having a cold/hot Marshall stability ratio measured at 750° F. and at 140° F. of below 12 to 1.

5. Composition according to claim 1 in which said resin has a softening point of about 212° F., an average mol. wt. of about 1,100, a specific gravity of about 0.97 and a bromine number of about 8.

6. Composition according to claim 1 in which said resin has a softening point of about 185° F.

7. Composition according to claim 1 in which said resin has a softening point of about 158° F.

8. Composition according to claim 1 also containing 0.1 to 5.0% of coloring pigment.

9. Composition according to claim 3 in which said polyethylene-resin blend comprises about 10 to 50% of a polyethylene having an average mol. wt. of 1,000 to 500,000, and 50–90% of said resin, said composition having a cold/hot Marshall stability ratio measured at 750° F. and at 140° F. of below 12 to 1.

10. Composition according to claim 3 in which said thermoplastic binder comprises 1–30% of polyethylene having an average mol. wt. of about 20,000 to 500,000.

11. Composition according to claim 3 in which said polyethylene has a mol. wt. of about 1,000 to 10,000.

12. Composition according to claim 11, in which the binder comprises about 10–30% of resin and 70–90% of a polyethylene of about 5,000 average mol. wt.

13. Composition according to claim 3 containing a blend of about 5–30% of said resin with about 70–95% of a polyethylene of 10,000–50,000 average mol. wt.

14. Composition comprising about 90–99% by wt. of aggregate whose particles are of about 100 mesh and larger bonded with about 1–10% of a blend comprising about 40–80% of a polyethylene of about 60,000–500,000 average mol. wt. and about 20–60% of a resin as defined in claim 1, said composition being thermoplastic at working temperatures of about 300–500° F. and having a Marshall stability measured at 140° F. of at least 2,000.

15. Composition comprising about 92–99% by wt. of aggregate whose particles are of about 100 mesh and larger bonded with about 2–8% of a blend comprising about two parts of polyethylene of about 20,000 average mole. wt. and one part of a resin as defined in claim 1, having a softening point of about 158° F., said composition being thermoplastic at working temperatures of about 300–500° F. and having a Marshall stability measured at 140° F. of at least 2,000.

16. Composition comprising about 93 to 94% of aggregate whose particles are of about 100 mesh and larger bonded with about 6 to 7% by wt. of a blend of two parts of a steam-cracked petroleum resin having a softening point of about 158° F., a specific gravity of about 0.96, and an average mol. wt. of about 1,000, and a carbon/hydrogen ratio of about 6.2 to 6.6, with one part of a polyethylene of 5,000 mol. wt., said polyethylene-resin-bonded aggregate composition having a Marshall stability measured at 140° F. of at least about 3,000 lbs., and having a 140° F. Marshall stability/flow ratio of at least about 300, and said composition being substantially oil-resistant.

17. The process which comprises preheating to a hot mixing temperature of about 250–400° F., about 1 to 10% by wt. of a blend of polyethylene and a steam-cracked petroleum resin having a softening point measured by the ring and ball method of between about 125° F. and about 230° F., an average mol. wt. of about 1,000 to 1,500, a specific gravity measured at 25/25° C. of about 0.96 to about 0.98, and a carbon/hydrogen ratio of about 6.0–7.0, and also preheating about 90 to 99% by wt. of aggregate having the major proportion of its particles of about 100 mesh and larger infusible at said hot mixing temperatures, and finally hot mixing said preheated polyethylene-resin blend and said preheated filler particles to make a hot thermoplastic mixture which, when shaped, compacted and cooled will have a Marshall stability measured at 140° F. of at least 2,000 lbs.

References Cited in the file of this patent

UNITED STATES PATENTS

| 2,279,762 | Scott et al. | Apr. 14, 1942 |
| 2,823,194 | McKay et al. | Feb. 11, 1958 |
| 2,861,895 | Hardman | Nov. 25, 1958 |
| 2,894,925 | Morris et al. | July 14, 1959 |
| 2,914,501 | D'Ascoli | Nov. 24, 1959 |
| 2,925,831 | Welty et al. | Feb. 23, 1960 |

FOREIGN PATENTS

| 513,453 | Great Britain | Oct. 12, 1939 |
| 167,201 | Australia | Mar. 8, 1956 |